US010746422B2

(12) United States Patent
Merscher (10) Patent No.: US 10,746,422 B2
(45) Date of Patent: Aug. 18, 2020

(54) RECESSED PROFILE

(75) Inventor: Michael Merscher, Berlin (DE)

(73) Assignee: LUNOS LUFTUNGSTECHNIK GMBH FUR RAUMLUFTSYSTEME (DE)

( * ) Notice: Subject to any disclaimer, the term of this patent is extended or adjusted under 35 U.S.C. 154(b) by 1225 days.

(21) Appl. No.: 14/236,687

(22) PCT Filed: Jul. 9, 2012

(86) PCT No.: PCT/EP2012/063434
§ 371 (c)(1),
(2), (4) Date: Feb. 3, 2014

(87) PCT Pub. No.: WO2013/017378
PCT Pub. Date: Feb. 7, 2013

(65) Prior Publication Data
US 2014/0162543 A1    Jun. 12, 2014

(30) Foreign Application Priority Data

Aug. 3, 2011   (DE) .................. 10 2011 080 358
Aug. 3, 2011   (DE) .................. 20 2011 104 662 U (51) Int. Cl.
| | |
|---|---|
| *F24F 7/007* | (2006.01) |
| *F24F 7/08* | (2006.01) |
| *F24F 5/00* | (2006.01) |
| *F24F 12/00* | (2006.01) |
| *F24F 7/10* | (2006.01) |
| *F24F 13/30* | (2006.01) |

(52) U.S. Cl.
CPC .............. *F24F 7/08* (2013.01); *F24F 5/0017* (2013.01); *F24F 7/10* (2013.01); *F24F 12/002* (2013.01); *F24F 13/30* (2013.01); *F24F 2012/008* (2013.01); *Y02B 30/563* (2013.01); *Y02E 60/147* (2013.01)

(58) Field of Classification Search
CPC ........................................................ F24F 1/02
USPC ....... 454/233, 196, 200–202, 205, 209, 212, 454/214
See application file for complete search history.

(56) References Cited

U.S. PATENT DOCUMENTS

| | | | | |
|---|---|---|---|---|
| 2,019,351 | A * | 10/1935 | Lathrop | ................ F24F 12/001 165/157 |
| 3,738,621 | A * | 6/1973 | Anderson | ............ B60H 1/3202 261/105 |
| 3,941,185 | A | 3/1976 | Henning | |
| 4,082,863 | A * | 4/1978 | Dancy | .................... C04B 33/00 138/143 |
| 4,662,187 | A * | 5/1987 | Lamb | ........................ F24F 6/18 165/60 |

(Continued)

FOREIGN PATENT DOCUMENTS

| | | |
|---|---|---|
| DE | 6937165 U | 3/1970 |
| DE | 3613942 A1 | 10/1987 |

(Continued)

*Primary Examiner* — Vivek K Shirsat
*Assistant Examiner* — Ko-Wei Lin
(74) *Attorney, Agent, or Firm* — Ware, Fressola, Maguire & Barber LLP (57) ABSTRACT

The invention relates to a recessed hollow profile for mounting to a wall system in a wall of a building, which allows ventilation with efficient decentralised energy recovery. The invention also relates to a system for ventilating a room.

14 Claims, 11 Drawing Sheets

(56) References Cited

U.S. PATENT DOCUMENTS

| | | | | |
|---|---|---|---|---|
| 5,038,674 | A * | 8/1991 | Merges | B60H 1/00428 296/211 |
| 5,248,278 | A * | 9/1993 | Fuerst | B60H 1/00457 296/216.02 |
| 5,375,649 | A | 12/1994 | Nilsen et al. | |
| 5,396,783 | A * | 3/1995 | Park | F24F 1/0007 62/411 |
| 6,342,005 | B1 * | 1/2002 | Daniels | F24F 13/24 181/224 |
| 6,662,572 | B1 * | 12/2003 | Howard | B60H 1/00264 62/235.1 |
| 7,238,105 | B2 * | 7/2007 | Reinders | F24F 5/0035 454/223 |
| 7,394,654 | B2 * | 7/2008 | Zieman | G06F 1/20 312/236 |
| 7,768,780 | B2 * | 8/2010 | Coglitore | H05K 7/20745 165/122 |
| 8,581,088 | B2 * | 11/2013 | Bohl | H01L 35/32 136/200 |
| 2007/0151278 | A1 * | 7/2007 | Jarvis | F24F 5/0035 62/310 |
| 2008/0264070 | A1 * | 10/2008 | Teschner | B60H 1/00428 62/3.61 |
| 2009/0219689 | A1 * | 9/2009 | Kempf | H05K 7/20563 361/695 |
| 2010/0020537 | A1 * | 1/2010 | He | F21K 9/233 362/234 |
| 2011/0164384 | A1 | 7/2011 | Vogel et al. | |
| 2011/0250066 | A1 * | 10/2011 | De Roche | B64C 11/001 415/214.1 |

FOREIGN PATENT DOCUMENTS

| | | |
|---|---|---|
| DE | 8516718 U1 | 8/1990 |
| DE | 4104423 A1 | 8/1992 |
| DE | 9301812 U1 | 5/1993 |
| DE | 19638535 A1 | 3/1998 |
| DE | 19730019 C1 | 1/1999 |
| DE | 19811469 A1 | 9/1999 |
| DE | 20118672 U1 | 2/2002 |
| EP | 0890802 A2 | 1/1999 |
| GB | 1 489 461 | 10/1977 |
| GB | 2 244 127 A | 11/1991 |
| JP | 2001289500 A | 10/2001 |
| WO | 94/08182 | 4/1994 |
| WO | 2009/147558 A1 | 12/2009 |
| WO | 2010/085197 A2 | 7/2010 |

* cited by examiner

RECESSED PROFILE

CROSS REFERENCE TO RELATED APPLICATIONS

This application is the U.S. National Stage of International Application Number PCT/EP2012/063434 filed on Jul. 9, 2012 which application claims priority under 35 USC § 119 to German Patent Application No. 10 2011 080 358.0 filed on Aug. 3, 2011 and German Patent Application No. 20 2011 104662.5 filed on Aug. 3, 2011. All three of these applications are hereby incorporated by reference in their entirety.

TECHNICAL FIELD

The invention relates to a recessed hollow profile for mounting to a wall system in a wall of a building.

BACKGROUND OF THE INVENTION

Efficient ventilation of rooms, such as living space or office space, is becoming increasingly important in connection with energy-saving measures. Air exchange with outside air can be achieved by opening a window, but when the heating or air-conditioning is switched on, a large amount of thermal energy escapes through the window, or warm air flows into the cooled interior of the building. A substantial proportion of the energy used for heating or cooling is lost as a result. Furthermore, an open window is always associated with a greater risk of burglary.

For these reasons, systems have already been developed with which heat can be recovered decentrally when ventilating a room. In this context, "decentrally" means independently of any heating or cooling system that is installed. However, common systems require much space and project into the room, due to the heat storage units that are needed. Extensive construction measures are also necessary in order to install such systems.

SUMMARY OF THE INVENTION

It would therefore be desirable to provide a ventilation system with decentralised heat recovery involving less complexity and expense, and more particularly requiring less space.

This is achieved according to the invention by a system according to claim 1. Preferred embodiments can be found in the dependent claims.

According to a first aspect, the invention relates to a recessed hollow profile for mounting to a wall system in a wall of a building. The recessed hollow profile has a hollow profile interior which is in the form of a flow space and which has an inlet and an outlet. The recessed hollow profile also has a heat exchanging material through which air can flow and which is arranged in the flow space between the inlet and the outlet. It also has a ventilation system for bidirectional flow conveyance through the heat exchanging material. The ventilation system has at least one fan which is arranged in the flow space and is spaced apart from the heat exchanging material such that a flow homogenizing distance therefrom is maintained.

A wall system is understood here to mean elements which are typically installed in a wall. Examples include a window, a door, a window sill, a skirting board or the like. However, such an element may also be a wall opening which is specially designed for insertion of a recessed hollow profile.

The recessed hollow profile according to the invention achieves a significant reduction in the amount of space needed for decentralised ventilation with heat recovery, as well as an increase in efficiency and heat recovery, because the flow homogenizing distance results in air flowing more uniformly through the heat exchanging material. If the fan were immediately adjacent to the heat exchanging material, in contrast, a dead flow zone that arises with both radial and axial fans would result in a substantially non-uniform flow of air through the heat exchanging material. This would mean that the heat storage capacity of the heat exchanging material is not fully utilised.

The recessed hollow profile preferably has an outer casing, which may be made of steel, aluminium or plastic, for example. Viewed in cross-section, this outer casing of the recessed hollow profile or, put differently, the recessed hollow profile per se, is smaller than a mentally conceived rectangular boundary, at least one side of the rectangular boundary having a length of less than 15 cm, particularly preferably of less than 10 cm and especially preferably of less than 8 cm. A particularly preferred embodiment is one in which one side perpendicular to the former has a length of less than 15 cm, particularly preferably of less than 10 cm and especially preferably of less than 8 cm.

The inlet and the outlet of the hollow profile interior may be in the form of simple openings. However, they are preferably provided with ventilation grilles that prevent the intrusion of foreign matter. Fine-meshed fly grilles may also be attached to the inlet and the outlet to protect against dust and insects. If the inlet or the outlet are to meant to be closeable, lamellae or flaps, for example, may be used for that purpose.

In one preferred embodiment, the recessed hollow profile has an inner shutter which is attached to the recessed hollow profile by magnets. The inner shutter has two ventilation panels arranged on and associated with the vents and comprising ventilation slits or holes. If this shutter is removed and rotated by 180°, the vent is closed as a result because the ventilation panels are no longer arranged over the vents. The ventilation apparatus can be sealed so completely that air can no longer enter. An additional magnet is also mounted off-centre so that a Hall sensor mounted on the recessed hollow profile can detect the position of the shutter. The ventilation system can thus be switched off as soon as the shutter is removed, or replaced after rotation.

It should be noted that the designations "inlet" and "outlet" refer to a particular direction of air flow that is predetermined by the direction in which the fan rotates. For operating the recessed hollow profile to ventilate a room with heat recovery, it is advantageous when the direction of flow is alternated. In that respect, no design features are provided to distinguish between an inlet and an outlet. Instead, an inlet becomes and outlet and an outlet becomes an inlet when the direction of flow changes. The recessed hollow profile is preferably symmetrical in design for that reason, which in this case means that air can flow not only from the inlet to the outlet but also in the opposite direction. For the of clarity, only one of the designations is used in each case, throughout the description that follows, for a structural element which can be used equally as an inlet or as an outlet, without this meaning that the structural feature cannot also be used within the meaning of the other designation.

A flow guidance device is preferably also provided in the flow path between the fan and the inlet or the outlet adjacent to the fan, i.e. in the space in the fan airflow that does not contain any heat exchanging material. The air which the fan sucks in or blows out can be deflected with minimal loss by this flow guidance device; more particularly, the flow guidance device can deflect the air from an aperture (inlet or outlet) to the fan, or vice versa.

The heat exchanging material in the flow space between the inlet and the outlet is such that it heats up when air with a higher temperature than the temperature of the heat exchanging material flows through it. It cools, similarly, when air with a lower temperature than the temperature of the heat exchanging material flows through it. In other words, if the fan is switched so that air is guided outdoors from a heated room, then heat exchanging material that has previously cooled down can thus be heated by that air. Thermal energy is extracted from the air in that process. If the fan then reverses its direction of rotation, so that air is guided into the room from the cold outdoors, this air flows past the warmer heat exchanging material. The air is heated in the process. Some of the heat that would otherwise be lost by conventional ventilation is thus recovered. The principle operates conversely in air-conditioned rooms.

Ceramics, in particular ceramics containing metal oxides or metals, are suitable heat exchanging materials. Aluminium oxide, for example, is used for this purpose. Pure metals or metal alloys, as well as plastics, may also be used as heat exchanging materials.

A ventilation system for bidirectional flow conveyance through the heat exchanging material has at least one fan. According to one embodiment of the invention, the ventilation system has exactly one fan which can be operated bidirectionally. A change in the direction of airflow can thus be achieved by reversing the polarity of the fan and thus changing its direction of rotation. Alternatively, the ventilation system may also have a first fan which is arranged between the heat exchanging material and the inlet, and a second fan which is arranged between the heat exchanging material and the outlet. There are two options in this case. One option is that both fans run simultaneously and maintain the flow of air in the same direction. The alternative option is to use one of the two fans only for airflow in the one direction and the other fan only for airflow in the other direction. In that case, there is preferably always one fan that is idle while the other rotates. Put differently, the first fan and the second fan in this embodiment can be operated alternately, each fan being operable in one direction of flow only.

According to one embodiment, the fan, or at least one of the fans, is an axial fan. A radial fan may likewise be used.

Due to the flow homogenizing distance that the fan maintains from the heat exchanging material, a flow of air generated by the fan passes uniformly through the heat exchanging material. Aforementioned dead flow zones of fans—zones that are generally arranged around the centre of axial fans, or due to the structure of radial fans—no longer have the effect of preventing a sufficient flow of air onto the heat exchanging material. It is possible, instead, that in regions through which insufficient air flows in the case of a fan located immediately adjacently to the heat exchanging material, due to a dead zone of the fan, heat is stored or returned. The problem of poor efficiency that otherwise arises is thus avoided. In summary, the concept of a flow homogenizing distance prevents dead zones and substantially improves efficiency.

If no flow homogenizing distance is maintained, an axial fan, for example, will blow air unevenly into the heat exchanger. Air will flow much more strongly through an outer region of the cross-sectional area than through a central region of the cross-sectional area. As a result, the central region will not be sufficiently preheated by warm air. In the second cycle, i.e. when outside air is sucked through, the heat exchanger will be uniformly perfused, but colder air will now flow in the central region of the cross-sectional area of the heat exchanger, because there only little thermal energy is stored in that region. The efficiency of the heat exchanger as a whole will therefore suffer as a result. By providing the flow homogenizing distance, in contrast, the airflow of the fan is swirled and broken in such a way that the air flows uniformly through the heat exchanger in both the outer region and the central region, also during the first cycle, and heats those regions uniformly, so that heat can be dissipated equally uniformly in the outer and the central regions to outside air flowing into the heat exchanger.

In one embodiment, the fan is an axial fan which has a fan impeller, the outer circumference of which can be described by a circle in at least one plane perpendicular to the fan axis. In this embodiment, the flow homogenizing distance is equal to the radius of the circle, with a variation of at most 20%. The variation in any region is preferably less than 10%. It is particularly advantageous when the flow homogenizing distance is exactly equal to the radius of the circle.

The flow homogenizing distance is preferably less than 10 cm and particularly preferably is less than 3 cm. It is possible with such values to achieve sufficient airflow distribution while simultaneously reducing the installation dimensions. Keeping a suitable flow homogenizing distance ultimately allows the installation dimensions to be reduced, because sufficient and efficiently used heat storage is available.

In the flow homogenizer space, an air diffusor may also be arranged to help provide a uniform distribution of airflow. For example, cotton wool, a nonwoven material or some other porous material may be used for this purpose. By providing such an air diffusor, the flow homogenizing distance necessary for sufficient uniformity of flow can be reduced, so the installation dimensions can also be reduced further and advantageously.

Further optimisation in the flow of air onto the heat exchanger can be achieved by inclining the fan. This is done by arranging the fan in such a way that its rotational axis is rotated out of the airflow by an angle of between 30° and 60°. In this way, the airflow is swirled additionally before entering the heat exchanger, with the result that air can flow more uniformly onto the heat exchanger. Such a fan arrangement also results in low power consumption by the fan.

According to one embodiment of the invention, a flow path through the heat exchanging material runs transversely to the respective flow paths through the inlet and through the outlet. Expressed differently, this means that, after passing through the inlet, the air is firstly deflected by approximately 9°, then flows through the fan and through the heat exchanging material, before being deflected once again by 90° and flowing out of the recessed hollow profile through the outlet. With such an arrangement, the cross-section of the recessed hollow profile can be kept small, since the length of the recessed hollow profile can be used to accommodate the heat exchanging material. Alternatively, however, the inlet and the outlet may also lie opposite each other, with the heat exchanging material and the fan being located between the inlet and the outlet. Such an embodiment may be advantageous when, for example, a longer distance between the inlet and the outlet is available.

The heat exchanging material is preferably contained in a cassette. This allows a heat exchanging material to be used which is in the form of a powder or globules, for example, and which would otherwise be blown away by the airflow in the absence of an cassette enclosing the material. Alternatively, it is possible to insert or use a heat exchanging material which is solid and which is attached directly to the recessed hollow profile. The heat exchanging material may be distributed homogeneously or inhomogeneously.

The recessed hollow profile preferably has a noise control component for blocking fan noise. This makes it possible to reduce or prevent any noise pollution in the room that is to be ventilated with the aid of the recessed hollow profile. Noise control may be provided in the form of sound-absorbing insulation, for example. Sound-absorbing insulation may simultaneously be heat-insulating. An alternative is to provide insulation that is primarily heat-insulating, which can further improve the efficiency.

The recessed hollow profile preferably has sleeves arranged in the flow space perpendicularly to the direction of flow. These sleeves are suitable for supporting loads and/or for receiving screws with which a window or a door, for example, can be joined to the masonry. Such a screw connection through the sleeve also helps to improve protection against burglary. The sleeves can also be used to lock various parts of the recessed hollow profile, such as the fan, the heat exchanger or the flow guidance device, into position. The sleeves are preferably inserted directly into the hollow profile.

According to a second aspect, the invention relates to a system for ventilating a room, said system having a recessed hollow profile according to the first aspect of the invention and a further recessed hollow profile according to the first aspect of the invention. The recessed hollow profile and the further recessed hollow profile are advantageously switched alternatingly to opposite directions of flow.

Possible embodiments and advantages, described with reference to the recessed hollow profile according to the first aspect of the invention, pertain equally to the system according to the second aspect of the invention. For example, any embodiments described with reference to the first aspect of the invention may be used for both the recessed hollow profile and also for the further recessed hollow profile. The recessed hollow profile and the further recessed hollow profile are preferably identical in design.

Switching alternatingly to opposite directions of flow is understood to mean that one recessed hollow profile air blows air to the outside from the room to be ventilated while the other recessed hollow profile blows air simultaneously from the surroundings into the room. This ensures that no overpressure or underpressure ensues in the room.

When the heat exchanging material in the recessed hollow profile which blows air out of the room has heated up sufficiently, during uniform operation of the recessed hollow profile and the further recessed hollow profile, and the heat exchanging material in the further recessed hollow profile has cooled down sufficiently, the direction of airflow through the two recessed hollow profiles is respectively reversed. This can be done in the ways that are described in the foregoing. The heat exchanging material that is now warm then heats the air flowing in from the outside, while the heat exchanging material that is now cold is then heated by the air flowing from inside the room to the outside. In this way, optimal energy recovery is achieved, while also providing uniform ventilation and preventing any overpressure or underpressure in the room.

The recessed hollow profile and the further recessed hollow profile may be disposed independently of each other in different positions within the room. According to one embodiment, they are connected to each other. They may be connected to each other in such a way, for example, that together they form a rod-shaped structure.

When the recessed hollow profile and the further recessed hollow profile are connected to each other, the system according to one embodiment is preferably formed in the hollow adapter profile of a window or as the hollow adapter profile of a window. This allows the system to be installed immediately below, above or at the side of a window. Such a system could likewise be disposed in a separate opening in a wall, in a door frame, in a door threshold, or at other places.

According to a preferred embodiment, the system is formed as part of a window frame. This means that the system can be sold and installed as part of a window. No additional construction or installation work is then required. The system can also be elegantly integrated, therefore, in a window that needs to be inserted anyhow.

BRIEF DESCRIPTION OF THE DRAWINGS

Other features and advantages shall become obvious from the following embodiments described below with reference to the Figures, in which

FIG. 3 shows a front view of the system of FIG. 1a.

FIG. 4 shows a rear view of the system of FIG. 1a.

DETAILED DESCRIPTION

Figure 1A:
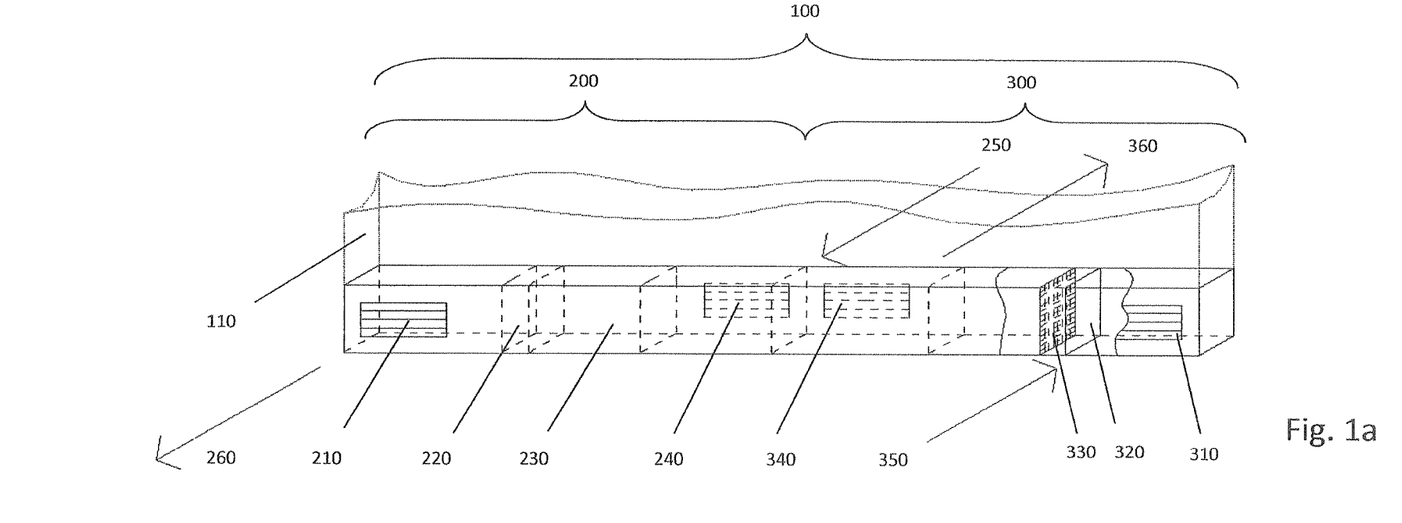
FIG. 1a shows an embodiment of a system according to the second aspect of the invention, with two recessed hollow profiles according to the first aspect of the invention.

FIG. 1a shows a system 100 according to the second aspect of the invention. The system has a first recessed hollow profile 200 and a second recessed hollow profile 300 according to the first aspect of the invention. Recessed hollow profiles 200, 300 are arranged one beside the other such that system 100 has an elongate shape overall.

System 100 is built into a wall 110. It can thus be used to ventilate a room.

The first recessed hollow profile 200 has a first outlet 210, a first inlet 240 and in the flow path therebetween a first fan 220 and a first heat exchanging material 230. Fan 220 sucks air according to one direction of flow 250 from an outer side, which is separated by wall 110 from an inner space, conducts the air through heat exchanging material 230, and finally blows the air through the first outlet 210 into the room according to a direction of flow 260. With the aid of heat exchanging material 230, the air is cooled or heated before it enters the room. In a typical case in which system 100 is used during a heating period, the first heat exchanging material 230 has a higher temperature than the air flowing through the first inlet 240. As a result, the air is heated before it flows into the room.

The second recessed hollow profile 300 in the case shown here functions in the reverse direction, but analogously. The second recessed hollow profile 300 has a second inlet 310, a second fan 320, a second heat exchanging material 330 and a second outlet 340.

With the aid of the second fan 320, air is sucked along a flow direction 350 through the second inlet 310 of the room. The second fan 320 then blows the air through the second heat exchanging material 330, which typically has a lower temperature during operation in the heating period than the air flowing through it. The second heat exchanging material 330 is heated in the process. The air finally flows outdoors through the second outlet 340.

Due to the functions described above, air is simultaneously drawn into the room and extracted from the room, which is separated by wall 110 from the ambient air. This prevents any overpressure or underpressure from arising, and as as result also preventing any undesirable or uncontrolled flow of additional air through cracks, keyholes or similar. However, system 100 also prevents heated air from flowing outdoors with great loss of energy. Instead, the heat of the outwardly flowing air is stored in the second heat exchanging material 330. The inwardly flowing air is firstly heated by the first heat exchanging material 230. After a certain length of time, the directions of fan rotation are reversed so that heat stored in the second heat exchanging material 330 is used to heat the air which is now blown into the room with the aid of the second recessed hollow profile 300. Simultaneously, air is then blown outdoors out of the room with the aid of the first recessed hollow profile 200, and the heat is stored in the first heat exchanging material 230. By reversing the polarity of the fans, the operations described above can be repeated sequentially as often as desired, thus ensuring that system 100 actually operates continuously.

Figure 1B:
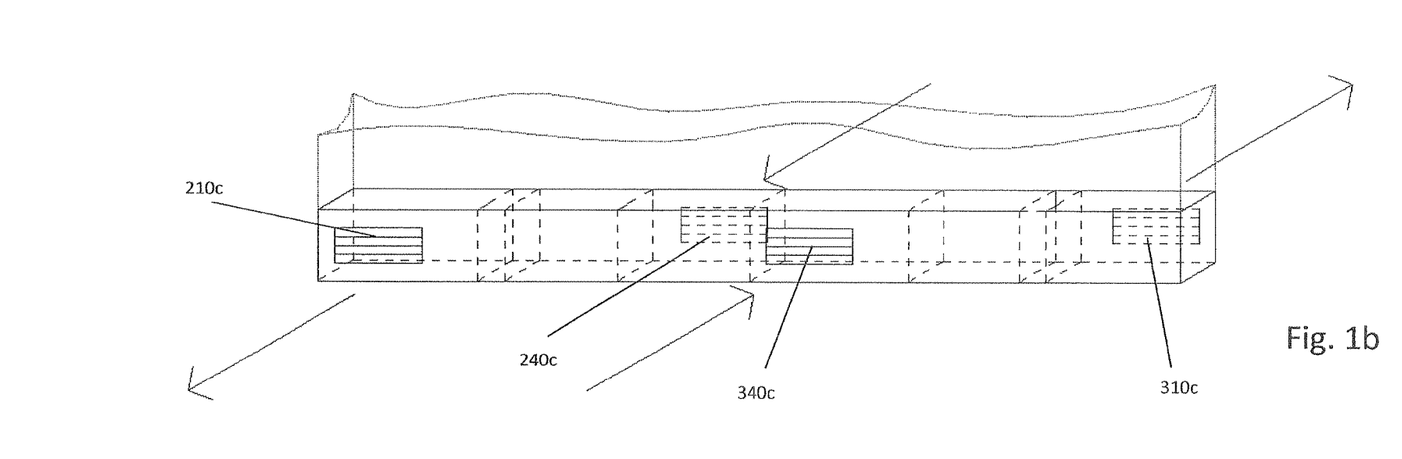
FIG. 1b shows an alternative embodiment of a system according to the second aspect of the invention.

FIG. 1b shows an alternative embodiment of the system shown in FIG. 1a, modified in such a way that a first inlet 240c and a second outlet 340c are spaced further apart than in the system shown in FIG. 1a. A first outlet 210c and a second inlet 310c are thus arranged closer to each other. There are otherwise no differences from the embodiment shown in FIG. 1a, so repetition is dispensed with.

Figure 2:
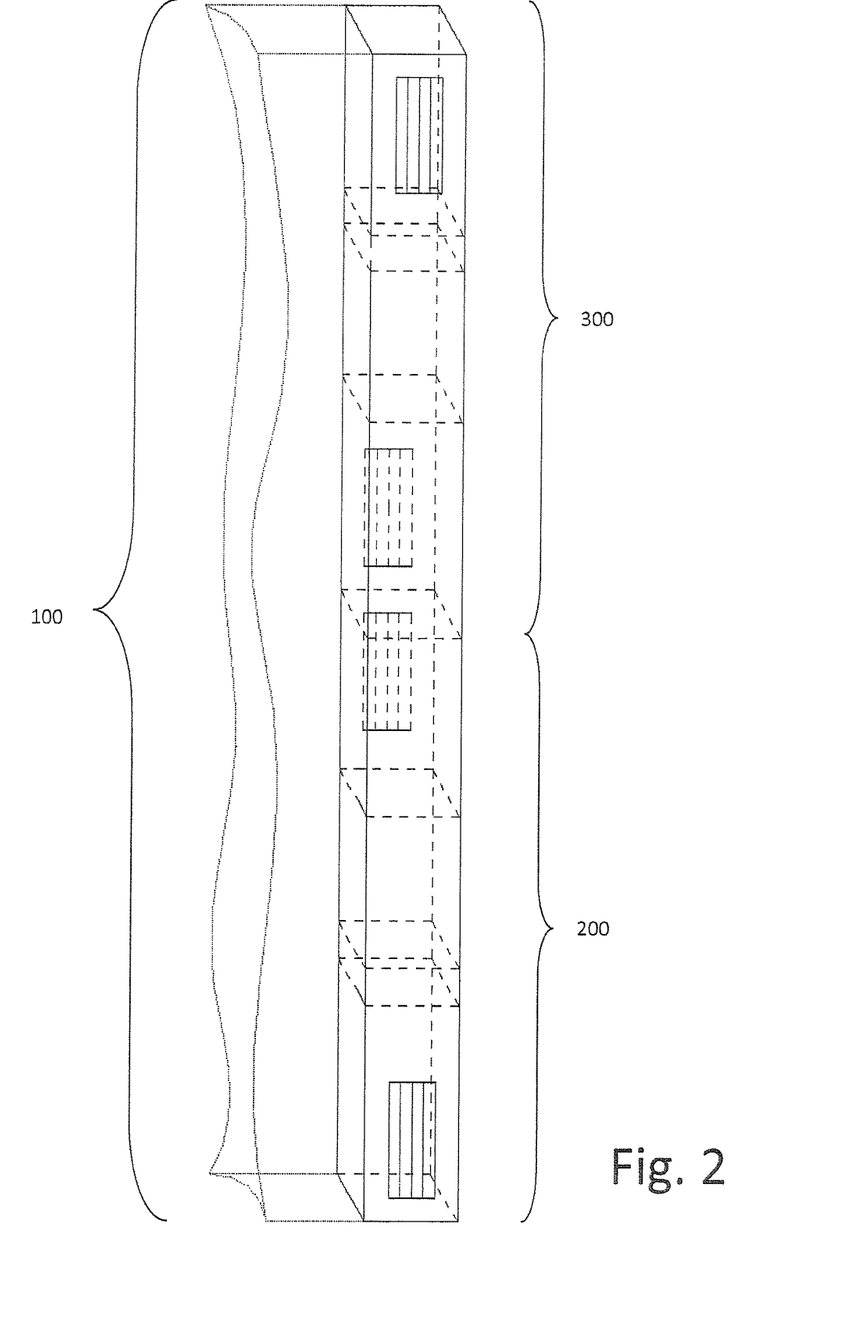
FIG. 2 shows the system of FIG. 1a in a differently installed state.

FIG. 2 shows the system 100 of FIG. 1a in a different installed state. In this case, system 100 is vertically installed, in contrast to the horizontal installation shown in FIG. 1a. The second recessed hollow profile 300 is located above the first recessed hollow profile 200.

Figure 3:
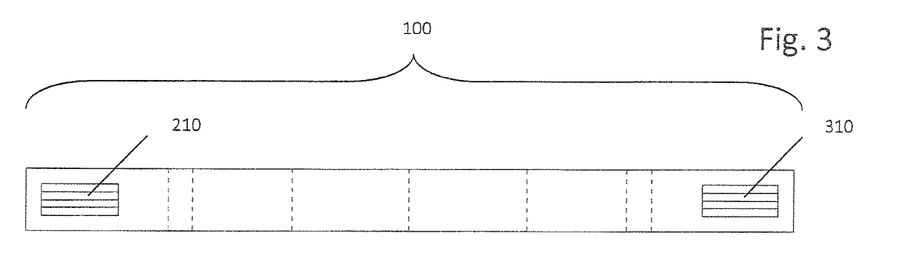

FIG. 3 shows a front view of the system 100 of FIG. 1a. Only the first outlet 210 and the second inlet 310 are visible here. The other elements of the first recessed hollow profile 200 and of the second recessed hollow profile 300 are not visible in this state. The front view shown here is typically the view that can be seen from inside a room. The first outlet 210 and the second inlet 310 are deliberately spaces sufficiently far apart that air blown into the room through the first outlet 210 is not immediately sucked out again by the second inlet 310.

Figure 4:
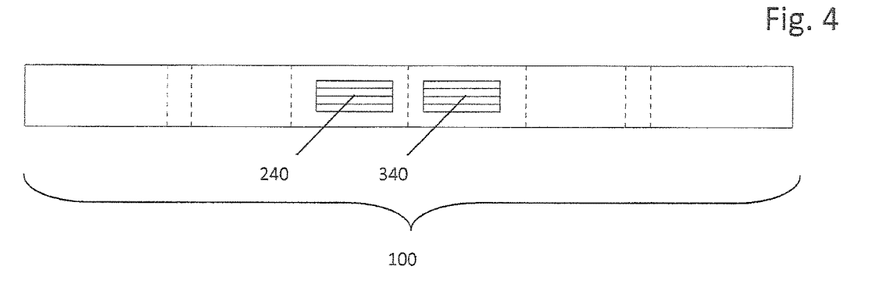

FIG. 4 shows a rear view of system 100 of FIG. 1a that can typically be seen from an outer side, i.e. from outdoors or from a colder room (e.g. a garage or the like). In this case, all that can be seen of the first recessed hollow profile 200 and the second recessed hollow profile 300 are the first inlet 240 and the second outlet 340. Although these are close to these other, this is usually unproblematic due to the wind that normally prevails outdoors and due to suitable air guidance, e.g. by lamellae which conduct the airflows in different directions. If, in a particular case, there is a risk that the outwardly flowing air might be sucked straight back in again, for example when installed in areas protected from the wind, then the system shown in FIG. 1b can preferably be used.

Figure 5:
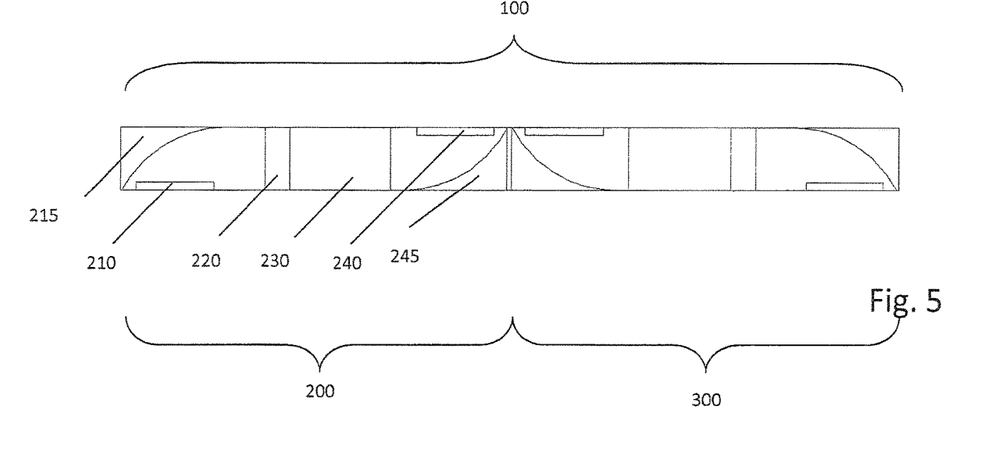
FIG. 5 shows the system of FIG. 1a in a cross-sectional view.

FIG. 5 shows the system 100 of FIG. 1a in a schematic cross-sectional view. Additional elements of the first recessed hollow profile 200, which are designed symmetrically and analogously in the second recessed hollow profile, are shown.

Recessed hollow profile 200 has a first flow guidance device 215 located in the flow path between the first outlet 210 and the first fan 220. The first flow guidance device 215 ensures that the air which is blown from the first fan 220 in the direction of the first outlet 210 is deflected by 90°, thus preventing any undesired turbulence or accumulation of air.

It can also be seen from FIG. 5 that, in addition to the components already mentioned, the first recessed hollow profile 200 has a second flow guidance device 245 which deflected the air flowing in from the first inlet 240 by 90° before it enters the first heat exchanging material 230. The benefit of the second flow guidance device 245 is similar to that of the first flow guidance device 215.

Figure 6:
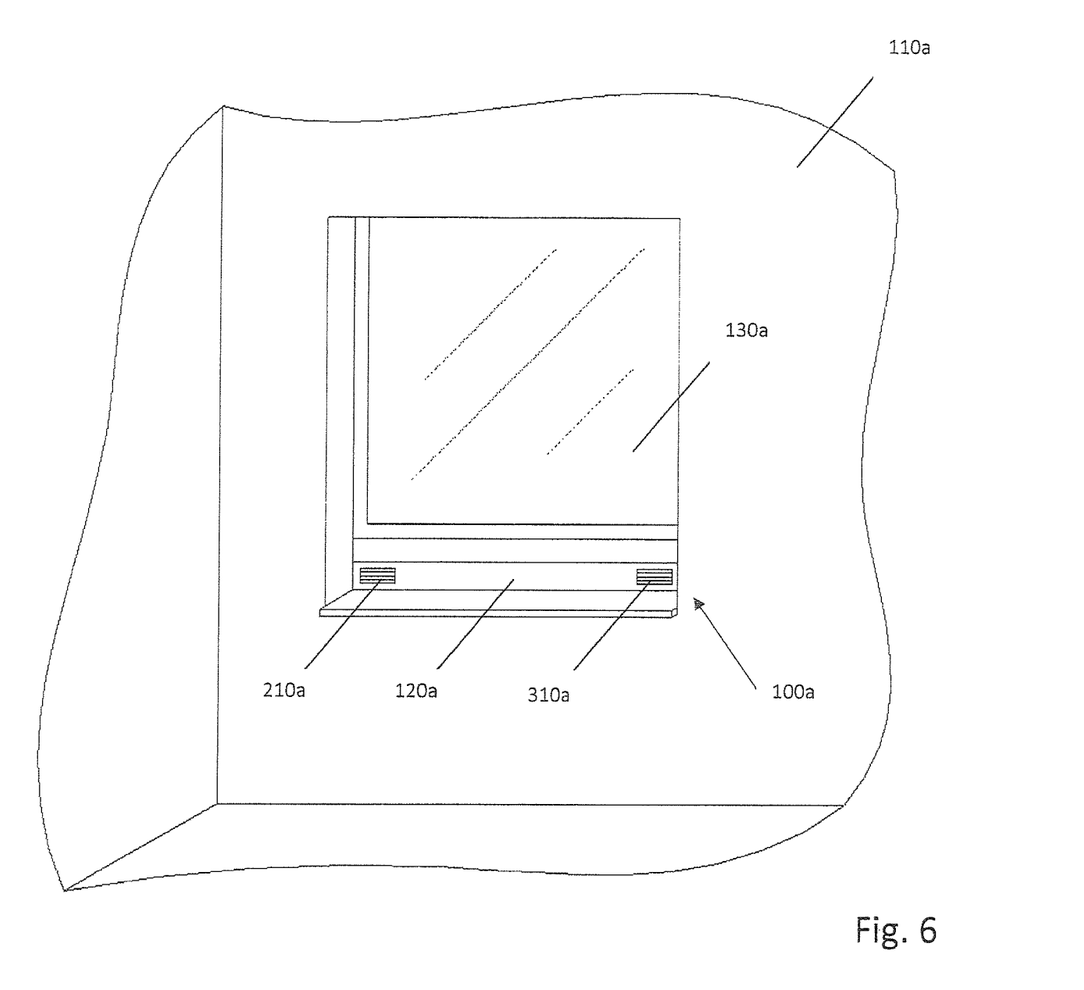
FIG. 6 shows an embodiment of a system according to the second aspect of the invention as shown in FIG. 1a, embodied in a hollow adapter profile of a window.

FIG. 6 shows an embodiment of a system 100a for ventilating a room, said system being formed in a hollow adapter profile 120a of a window 130a. Hollow adapter profile 120a is arranged immediately below window 130a, which is built into a wall 110a.

In the view shown here, as seen from inside the room, all that can be seen of the respective recessed hollow profiles in system 100a are the first outlet 210a and the second inlet 310a. No unshapely elements project into the room. Nor is the aesthetic appearance of window 130a and surrounding wall 110a impaired in any other way.

Figure 7:
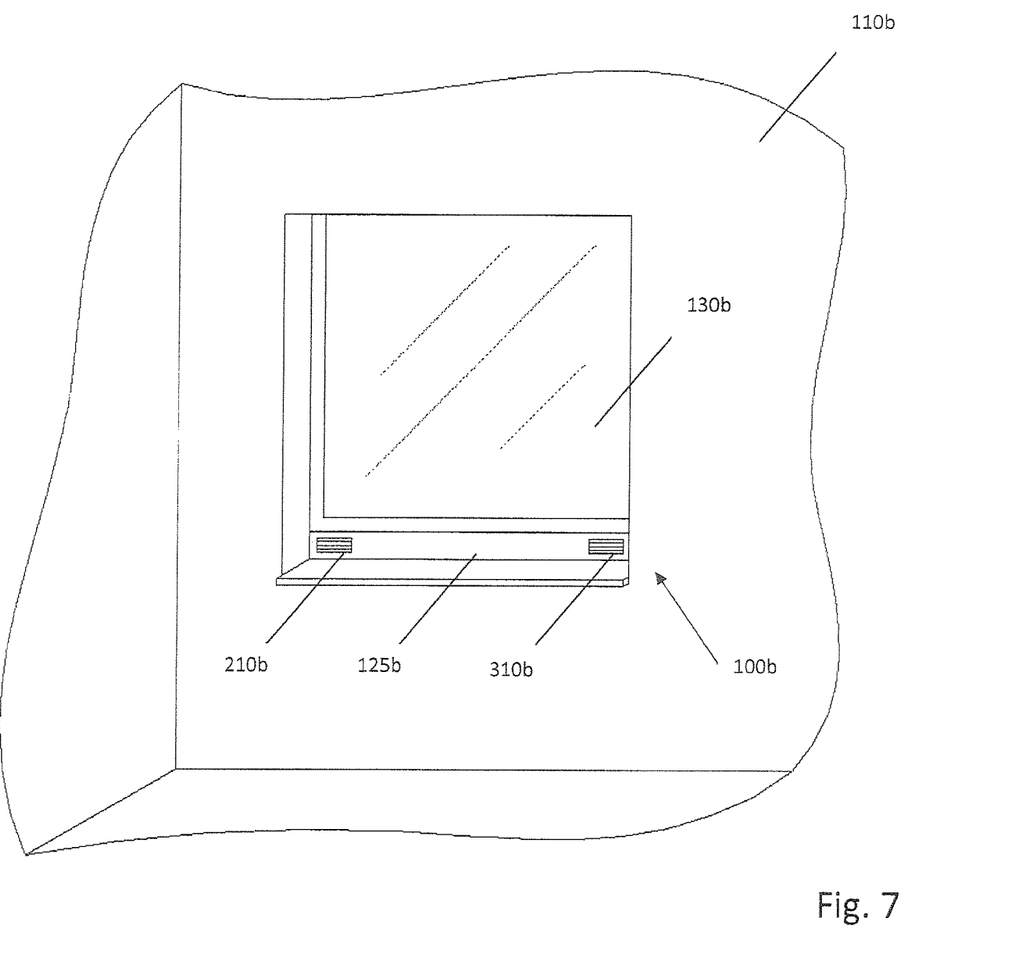
FIG. 7 shows an embodiment of a systems according to the second aspect of the invention as shown in FIG. 1a, embodied as part of a window frame.

FIG. 7 shows an embodiment of a system 100b similar to that shown in FIG. 6. Unlike the embodiment in FIG. 6, system 100b is built into a window frame 125b of window 130b. In this case also, only the first outlet 210b and the second inlet 310b are visible. The aesthetic appearance of window 130b and of surrounding wall 110b is not impaired.

Figure 8:
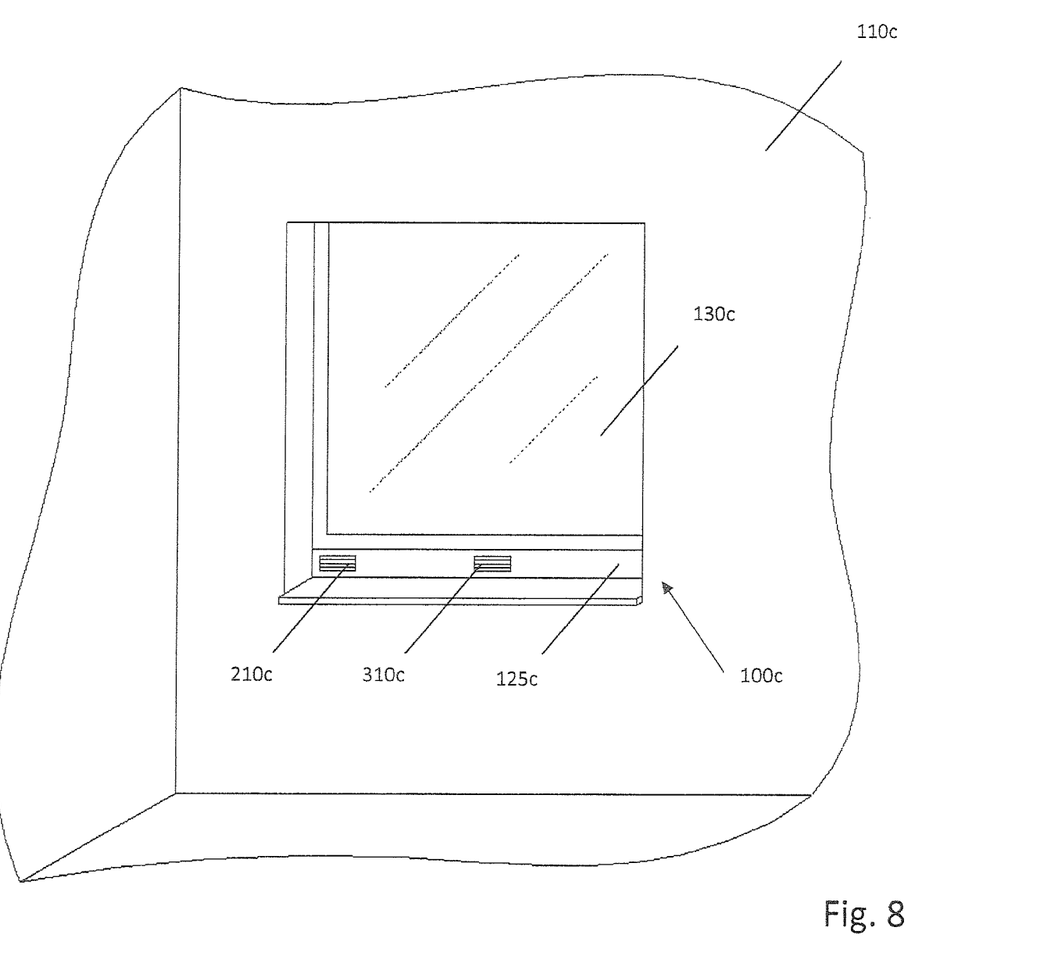
FIG. 8 shows an embodiment of a system according to the second aspect of the invention as shown in FIG. 1b, embodied as part of a window frame.

FIG. 8 shows an embodiment of a system 100c similar to the one shown in FIG. 7. Unlike the embodiment in FIG. 7, however, system 100c is embodied as shown in FIG. 1b. A first outlet 210c and a second inlet 310c are closer together, therefore. However, in this case also, the embodiment is otherwise one which is embodied as part of a window frame 125c of a window 130c in a wall 110c.

Figure 9:
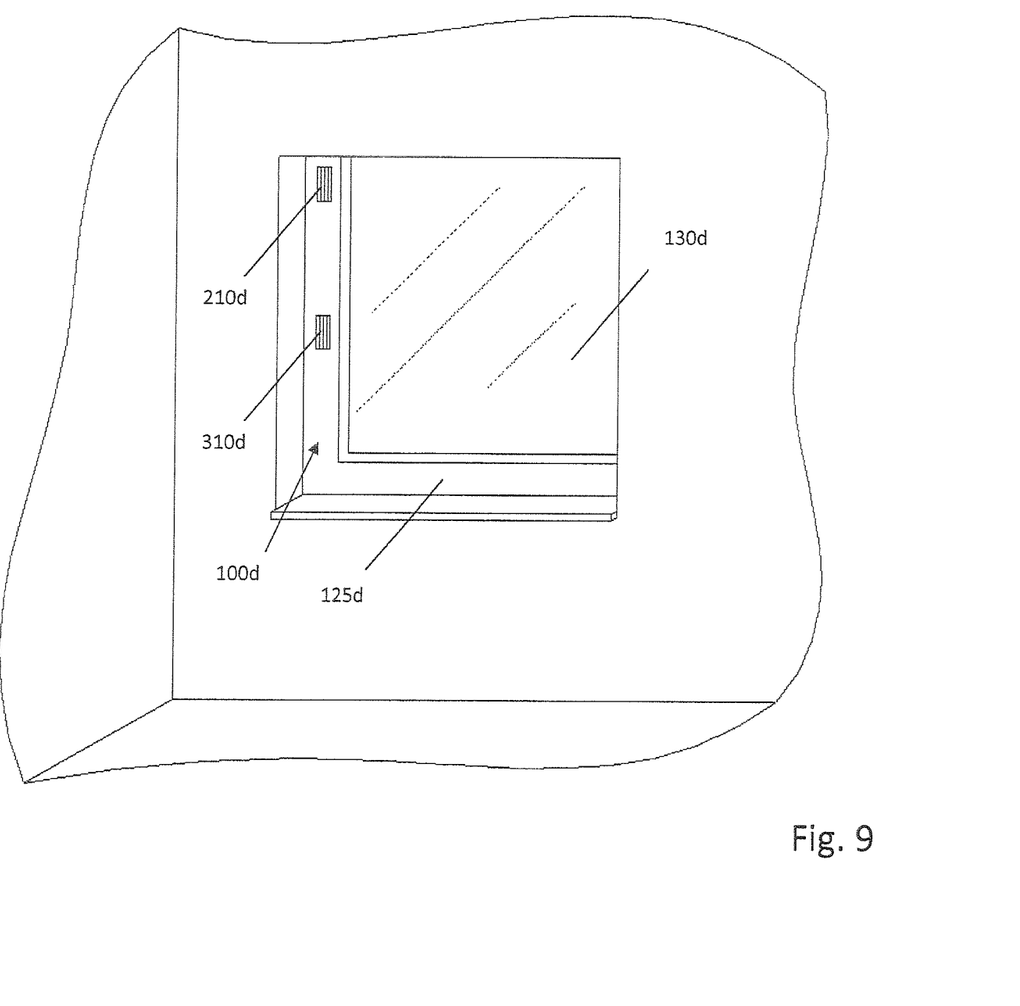
FIG. 9 shows an embodiment of a system according to the second aspect of the invention as shown in FIG. 1b, embodied as part of a window frame and arranged vertically.

FIG. 9 shows an embodiment of a system 100d which is similar in structure to the one shown in FIG. 8. Unlike the latter, however, system 100d is installed vertically in a window frame 125d of a window 130d, and not horizontally, as shown in FIG. 8.

Figure 10:
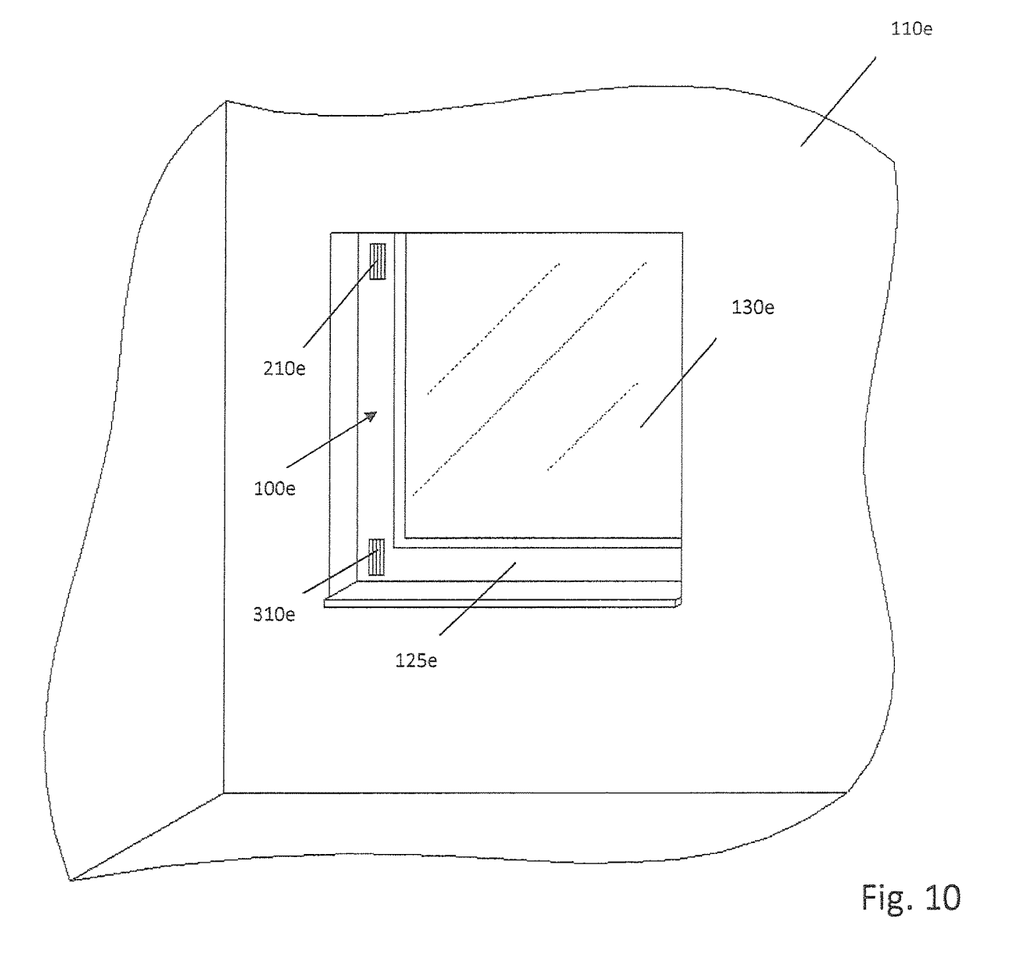
FIG. 10 shows an embodiment of a system according to the second aspect of the invention as shown in FIG. 1a, embodied as part of a window frame and arranged vertically.

FIG. 10 shows an embodiment of a system 100e which is similar in structure to the one shown in FIG. 9. Unlike the latter, however, system 100e is structured as shown in FIG.

1a. A first outlet 210e and a second inlet 310e are accordingly spaced further apart from each other. In the embodiment in FIG. 10 also, the system is embodied as part of a window frame 125e of a window 130e in a wall 110e.

FIGS. 11a)-c) show different views of an embodiment of a system 100f. FIG. 11a) shows an external view of the system from a first side x, FIG. 11b) a cross-section along line A-A in FIG. 11a), and FIG. 11c) an external view of the system from a second side y opposite the first side.

Figure 11:
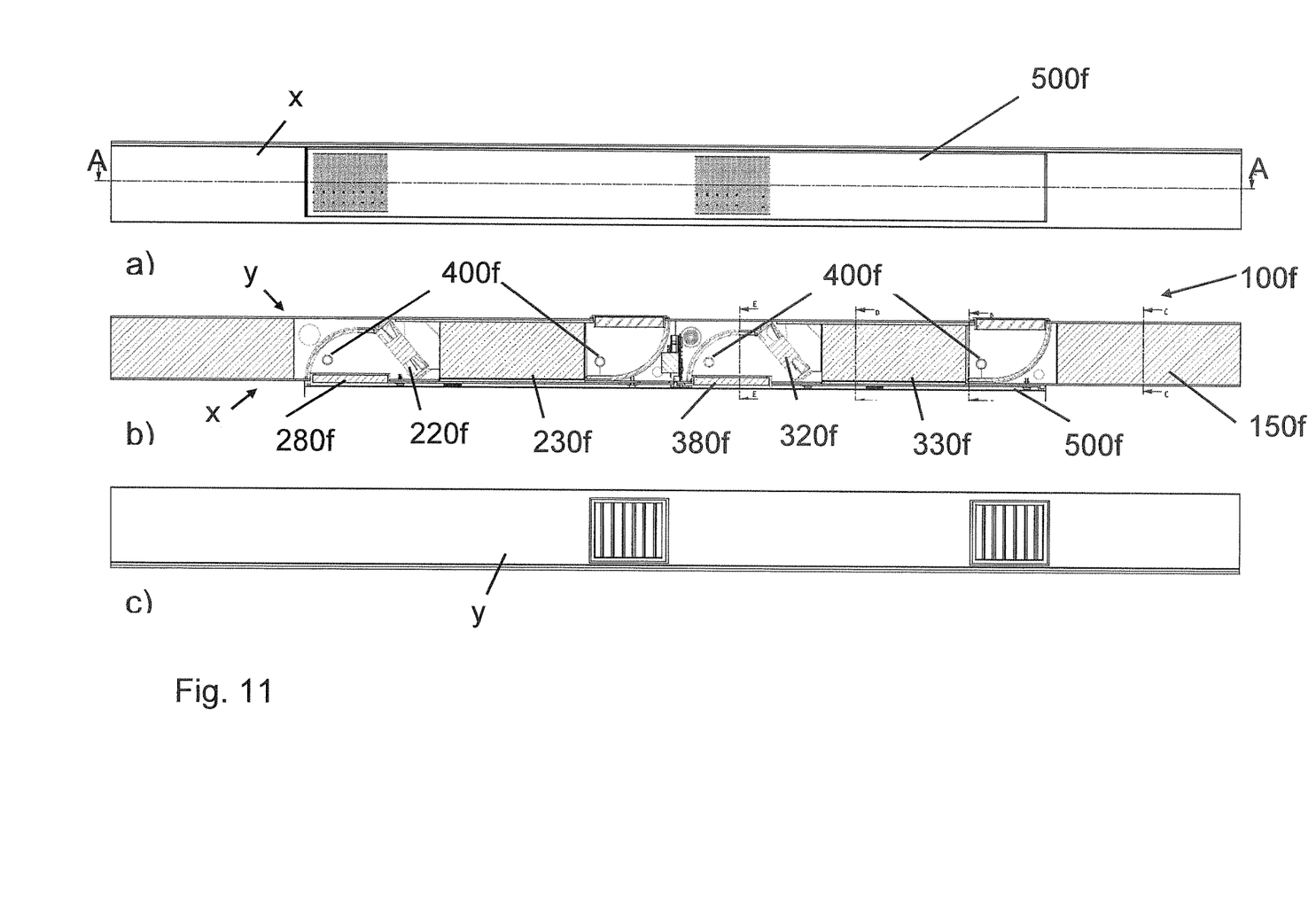
FIG. 11 shows in three sub-figures a), b) and c) a variant of an embodiment of a system according to the second aspect of the invention, as shown in FIG. 1b.

System 100f is similar in structure to the system shown in FIG. 1b. The following description concentrates on the differences. Unlike the system in FIG. 1b, axial fans 220f and 320f are arranged in system 100f such that their rotational axes are rotated 45° out of the airflow. Such a fan arrangement further optimises the flow of air onto heat exchanger 230f, 330f and results in lower power consumption by the fan.

The present embodiment also has sleeves 400f, through which screws for attaching the system to an adjacent wall can be guided. The sleeves are simultaneously used to fix the components of system 100f in relation to each other. An example of a suitable sleeve is shown in FIG. 13.

Figure 12:
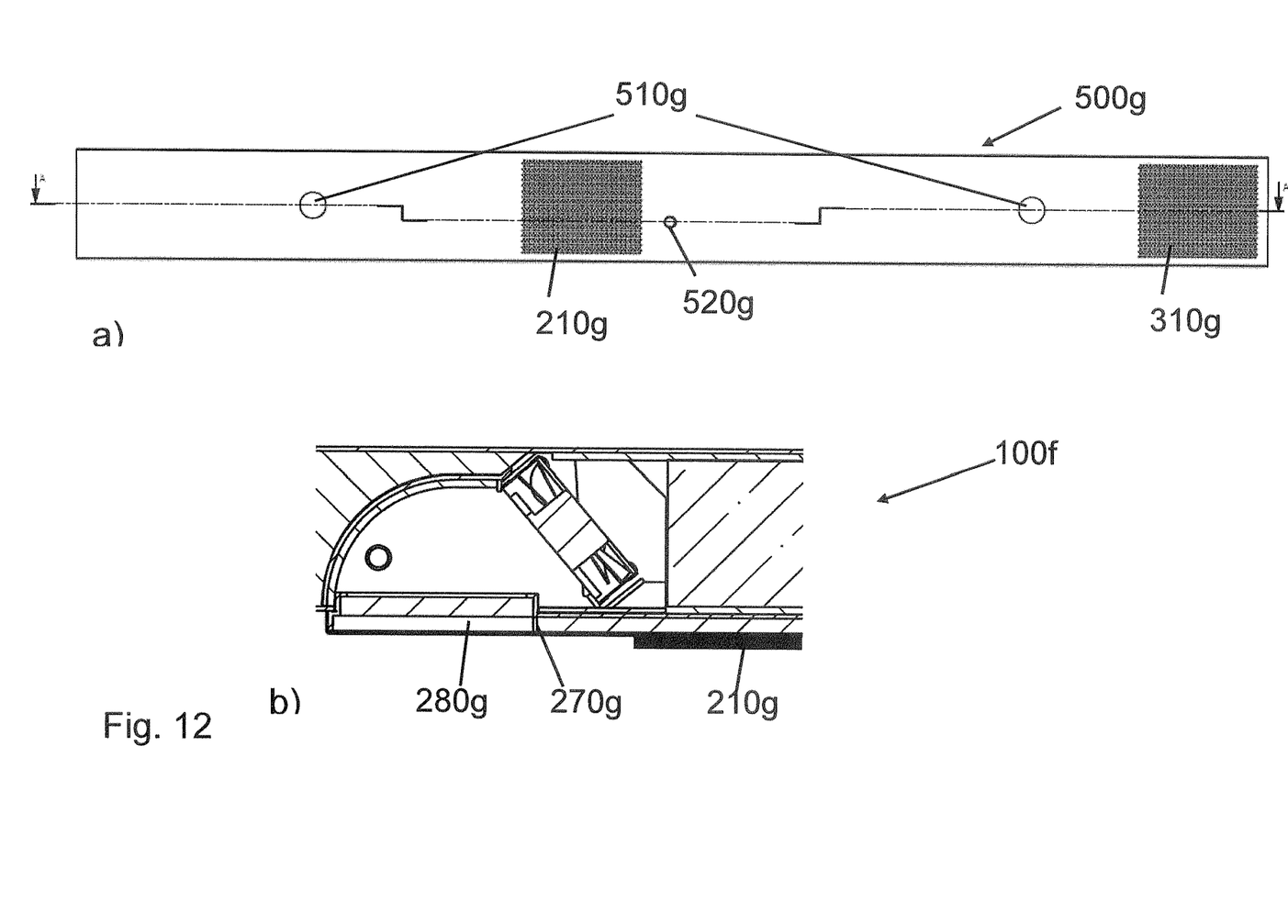
FIG. 12 shows in sub-figure a) an inner shutter for use in a system according to the second aspect of the invention, and in sub-figure b) the functional principle of the inner shutter rotated by 180°.

FIG. 12 a) shows a rear view of a suitable inner shutter 500g for system 100f. It has two magnets 510g for attaching it to system 100f and one magnet 520g, the position of which can be detected by a Hall sensor provided on system 100f but not shown here. Inner shutter 500g has a first outlet 210g and a second inlet 310g. The arrangement of the inlet and the outlet along the longitudinal extension of the inner shutter corresponds to the arrangement of vents 280f and 380f of system 100f in FIG. 11 b). More particularly, the arrangement is asymmetrical in relation to the longitudinal extension of the recessed hollow profile.

FIG. 12 b) shows the effect of the inner shutter on a section of system 100f. Inner shutter 500g is arranged here in its rotated position. When inner shutter 500g is rotated by 180° from its original position, in which outlet 210g of the inner shutter lies over vent 280g of system 100f, and attached accordingly, the inner shutter cooperates with a web 270g to close the system. The web runs along an outer side of a body 150f lying behind the inner shutter and forming a hollow profile, in such a way that, when the inner shutter is in this rotated position, no air is able to flow from outlet 210g of the inner shutter to vent 280g in body 150f. The Hall sensor detects the new position of the shutter, thus allowing switching-off of the ventilation system to be arranged.

Figure 13:
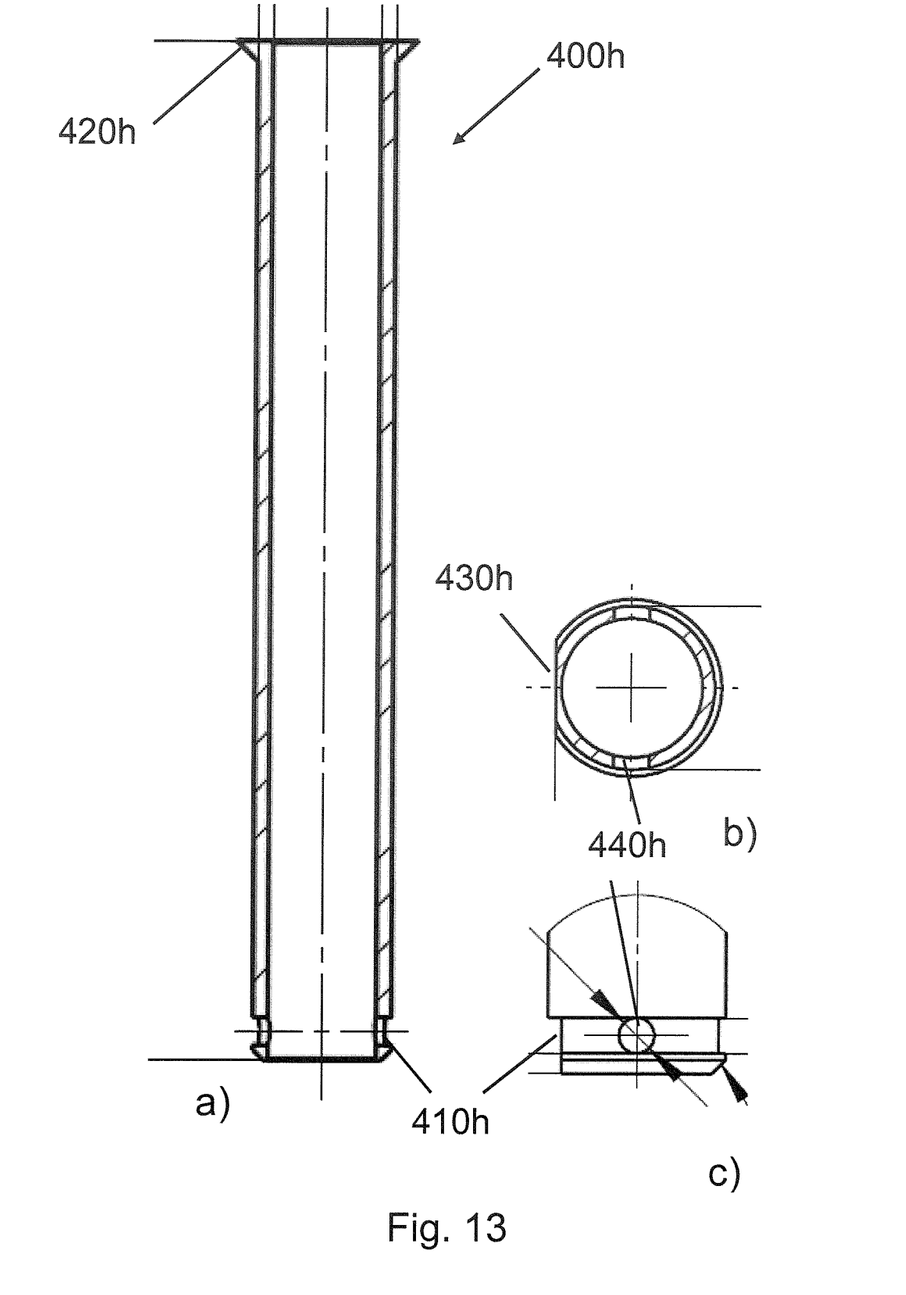
FIG. 13 shows in three views, FIGS. 13a), b) and c), a casing for a recessed hollow profile.

FIG. 13 shows, in three sub-figures 13a)-13c), an embodiment of a sleeve 400h for a recessed hollow profile, as shown, for example, in system 100f in FIG. 11. FIG. 13 a) shows a longitudinal section through sleeve 400h. At a bottom end, the sleeve has a circumferential groove 410h, in which a cable tie, for example, can be received for fixing the sleeve to the recessed hollow profile. At an opposite upper end, sleeve 400h has a circumferential bevelled edge 420h, with the aid of which it can be flush-mounted in a recessed bore in the recessed hollow profile.

FIG. 13b) shows a cross-sectional view of one variant of sleeve 400h, in a cross-sectional plane near the bottom end. The otherwise cylindrical sleeve has a circular inner cross-section here, whereas the outer cross-section includes a flattened portion 430h. A hole 440h in the region of the circumferential groove 410h and located at the height of the flattened portion is used to receive a locking pin. FIG. 13 c) shows a lateral partial view of this variant of sleeve 400h, likewise in the region of its bottom end.

LIST OF REFERENCE SIGNS

100 System
110 Wall
120 Hollow adapter profile
125 Window frame
130 Window
150 Body
200 First recessed hollow profile
210 First outlet
215 Flow guidance device
220 Fan
230 Heat exchanging material
240 First inlet
245 Second flow guidance device
250 Direction of flow
260 Direction of flow
270 Web
280 Vent
300 Second recessed hollow profile
310 Second inlet
320 Second fan
330 Second heat exchanging material
340 Second outlet
350 Direction of flow
400 Sleeve
410 Groove
420 Bevelled edge
430 Flattened portion
440 Hole
500 Inner shutter
510 Magnet for mounting
520 Magnet for position detection

What is claimed is:

1. A system for ventilating a room comprising: first and second recessed hollow profiles for mounting to a wall system in a wall of a building,
   wherein each of said first and second recessed hollow profiles comprises:
      a casing forming a hollow profile interior which is in the form of a flow space and which has an inlet and an outlet;
      a heat exchanging material through which air can flow and which is arranged in the flow space between the inlet and the outlet; and
      a ventilation system for bidirectional flow conveyance through the heat exchanging material; wherein
   the ventilation system has exactly one axial fan with a dead flow zone around the centre of the axial fan, the axial fan which can be operated bidirectionally, the fan arranged in the flow space and is spaced apart from the heat exchanging material such that a flow homogenizing distance therefrom is maintained, which defines a flow homogenizer space within the hollow profile interior, and wherein an air diffusor is arranged in the flow homogenizer space between the fan and the heat exchanging material so that a flow of air produced by the axial fan is distributed uniformly through the heat exchanging material by avoiding insufficient air flows over a cross section of the heat exchanging material due to the dead flow zone of the axial fan;
   wherein the heat exchanging material of the first recessed hollow profile is not shared with the second recessed hollow profile and wherein the heat exchanging material of the second recessed hollow profile is not shared with the first recessed hollow profile, and
   wherein the first and second recessed hollow profiles are switched alternatively to opposite directions of flow and wherein the first and second recessed hollow profiles are connected to each other as a hollow ventilation profile.

2. The system according to claim 1, wherein each of said first and second recessed hollow profiles has a first flow guidance device between the fan and the outlet and/or a second flow guidance device between the fan and the inlet.

3. The system according to claim 1, in which the flow homogenizing distance for each of said first and second recessed hollow profiles is less than 10 cm.

4. The system according to claim 1, wherein each of said first and second recessed hollow profiles is smaller in cross-section than a rectangular boundary, with at least one side of the rectangular boundary having a length of less than 15 cm.

5. The system according to claim 1, in which for each of said first and second recessed hollow profiles
 the axial fan has a fan impeller, the outer circumference of which can be described in at least one plane perpendicular to the fan axis by a circle, and
 the flow homogenizing distance is equal with a variation of at most 20% to the radius of the circle.

6. The system according to claim 1, wherein for each of said first and second recessed hollow profiles
 the heat exchanging material is a ceramic material.

7. The system according to claim 1, which is formed in or as a hollow adapter profile of a window or as part of a window frame.

8. The system according to claim 1, wherein for each of said first and second recessed hollow profiles the flow homogenizing distance is less than 1 cm.

9. The system according to claim 1, wherein each of said first and second recessed hollow profiles is smaller in cross-section than a rectangular boundary, wherein each of two perpendicular sides of the rectangular boundary has a length of less than 15 cm.

10. The system according to claim 1, wherein each of said first and second recessed hollow profiles is smaller in cross-section than a rectangular boundary, with at least one side of the rectangular boundary, having a length of less than 8 cm.

11. The system according to claim 1, wherein each of said first and second recessed hollow profiles is smaller in cross-section than a rectangular boundary, wherein each of two perpendicular sides of the rectangular boundary has a length of less than 8 cm.

12. The system according to claim 1, wherein for each of said first and second profiles
 the axial fan has a fan impeller, the outer circumference of which can be described in at least one plane perpendicular to the fan axis by a circle, and
 the flow homogenizing distance is equal with a variation of at most 10% to the radius of the circle.

13. The system according to claim 1, wherein for each of said first and second hollow profiles
 the axial fan has a fan impeller, the outer circumference of which can be described in at least one plane perpendicular to the fan axis by a circle, and
 the flow homogenizing distance is exactly equal to the radius of the circle.

14. The system according to claim 6, wherein the ceramic material contains a proportion of metal oxide.

\* \* \* \* \*